(12) United States Patent
Ramadass et al.

(10) Patent No.: US 10,727,758 B2
(45) Date of Patent: Jul. 28, 2020

(54) ACTIVE CLAMPING AND SCALABLE REFERENCE CONTROL FOR CAPACITOR-DROP POWER SUPPLIES

(71) Applicant: TEXAS INSTRUMENTS INCORPORATED, Dallas, TX (US)

(72) Inventors: Yogesh Kumar Ramadass, San Jose, CA (US); Andres Arturo Blanco, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/225,083

(22) Filed: Dec. 19, 2018

(65) Prior Publication Data

US 2019/0207532 A1 Jul. 4, 2019

Related U.S. Application Data

(60) Provisional application No. 62/610,996, filed on Dec. 28, 2017.

(51) Int. Cl.
*H02M 7/219* (2006.01)
*H02M 1/42* (2007.01)
*H02M 1/00* (2006.01)

(52) U.S. Cl.
CPC ............ *H02M 7/219* (2013.01); *H02M 1/42* (2013.01); *H02M 2001/0045* (2013.01); *H02M 2001/4283* (2013.01)

(58) Field of Classification Search
CPC .................. H02M 7/12; H02M 7/125; H02M 2001/4283; H02M 7/162; H02M 7/1623; H02M 7/1626; H02M 7/217; H02M 7/219; H02M 2001/0032; H02M 2001/0035; H02M 2001/0045
USPC .......................... 363/76, 77, 86, 88, 89, 127
See application file for complete search history.

(56) References Cited

U.S. PATENT DOCUMENTS

| 5,589,761 A * | 12/1996 | Nelson | H02M 1/36 323/282 |
| 6,373,790 B1 * | 4/2002 | Fujisawa | H02J 7/027 320/134 |
| 2011/0080761 A1 * | 4/2011 | Kung | H02M 7/219 363/127 |
| 2015/0103566 A1 * | 4/2015 | Keogh | H02M 3/33507 363/21.12 |
| 2015/0263531 A1 * | 9/2015 | Kozakai | H02J 50/80 307/104 |
| 2015/0364928 A1 * | 12/2015 | Yen | G05F 1/575 320/108 |

* cited by examiner

*Primary Examiner* — Alex Torres-Rivera
(74) *Attorney, Agent, or Firm* — Michael A. Davis, Jr.; Charles A. Brill; Frank D. Cimino

(57) ABSTRACT

A capacitor-drop power supply includes a rectifier and a rectifier controller. The rectifier is configured to receive an alternating current (AC) signal at an AC voltage and convert the AC signal into a rectified direct current (DC) signal at a rectified voltage. The rectifier includes a first low side switch. The rectifier controller is configured to generate a switch close signal based on the rectified DC signal. The switch close signal is configured to close the first low side switch shunting the AC signal to ground.

13 Claims, 3 Drawing Sheets

ACTIVE CLAMPING AND SCALABLE REFERENCE CONTROL FOR CAPACITOR-DROP POWER SUPPLIES

CROSS-REFERENCE TO RELATED APPLICATION

This application claims priority, and incorporates by reference, U.S. Provisional Appln. No. 62/610,996 entitled "Active Clamping and Scalable Reference Control for Capacitor-Drop Power Supplies" filed Dec. 28, 2017.

BACKGROUND

Capacitor-drop power supplies generate a supply voltage (e.g., a direct current (DC) voltage) for circuits that is lower than the mains voltage (e.g., an alternating current (AC) voltage received from a wall socket; line voltage) by utilizing the capacitive reactance of a capacitor. In other words, capacitor-drop power supplies take the mains voltage and generate a lower voltage level DC signal utilizing a capacitor. Capacitor-drop power supplies are typically utilized in low-power applications such as electricity meters (e-meters) and other low power systems.

SUMMARY

In accordance with at least one embodiment of the disclosure, a capacitor-drop power supply includes a rectifier and a rectifier controller. The rectifier is configured to receive an AC signal at an AC voltage and convert the AC signal into a rectified DC signal at a rectified voltage. The rectifier includes a first low side switch. The rectifier controller is configured to generate a switch close signal based on the rectified DC signal. The switch close signal is configured to close the first low side switch shunting the AC signal to ground.

Another illustrative embodiment is a bridge rectifier for a capacitor-drop power supply to generate a rectified DC signal at a rectified voltage from an AC signal. The bridge rectifier includes a first low side device coupled with a rectifier controller, a second low side device coupled with the rectifier controller, a first high side device coupled to the first low side device, and a second high side device coupled to the second low side device. The first low side device and the second low side device are configured to close causing the AC signal to shunt to ground in response to receiving a switch close signal generated by the rectifier controller based on the rectified DC signal.

Yet another illustrative embodiment is a method of clamping an AC signal in a capacitor-drop power supply. The method includes receiving the AC signal at an AC voltage. The method also includes converting, by a rectifier, the AC signal into a rectified DC signal at a rectified voltage. The method also includes, in response to the rectified voltage exceeding a threshold value, closing a first low side switch of the rectifier to shunt the AC signal to ground. The method also includes, in response to the rectified voltage being less than the threshold value, opening the first low side switch.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct connection. Thus, if a first device couples to a second device, that connection may be through a direct connection, or through an indirect connection via other devices and connections. Also, in this description, the recitation "based on" means "based at least in part on." Therefore, if X is based on Y, then X may be based on Y and any number of other factors.

Capacitor-drop power supplies generate a supply voltage (e.g., a direct current (DC) voltage) for circuits that is lower than the mains voltage (e.g., an alternating current (AC) voltage received from a wall socket) by utilizing the capacitive reactance of a capacitor. In other words, capacitor-drop power supplies take the mains voltage and generate a lower voltage level DC voltage utilizing a capacitor. Capacitor-drop power supplies are typically utilized in low-power applications such as electricity meters (e-meters) and other low power systems.

Conventional capacitor-drop power supplies utilize a high voltage capacitor in series with a Zener diode to generate a lower voltage level DC signal. The voltage of the AC signal from the mains voltage drops across the high voltage capacitor, and the Zener diode acts to clamp the lower voltage level DC signal to the lower voltage level (e.g., 5V, 3V, etc.). In other words, such a capacitor-drop power supply's non-isolated offline bias supply is typically regulated by an off-chip Zener clamp. A linear regulator then can regulate the resulting signal to drive a load. However, the Zener clamp of such a conventional capacitor-drop power supply consumes power at light loads, thus, increasing the quiescent current (IQ) and reducing efficiency. Thus, it would be desirable for a capacitor-drop power supply to be scalable to generate output current to drive the load based on the needs of the load at a particular point in time.

In accordance with various examples, a capacitor-drop power supply includes a rectifier circuit to convert the input AC signal into a rectified DC signal. A rectifier controller controls the rectifier circuit by controlling the switching of two low side devices within the rectifier. Thus, when the rectified DC signal generated by the rectifier is too high for the requirements of a load (e.g., the load requires no current), then the rectifier controller closes the two low side devices (e.g., switches) thus, shunting the AC signal to ground. In this way, the system is capable of reducing the amount of power consumed at light loads, thus, reducing the IQ and increasing efficiency.

Figure 1:
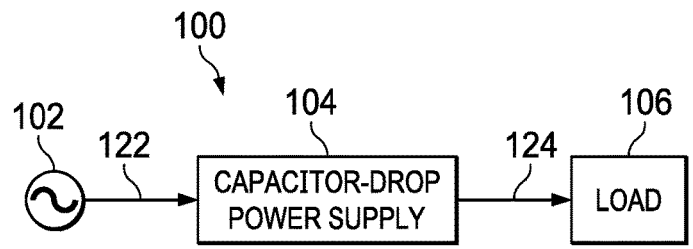
FIG. 1 shows an illustrative block diagram of a power supply system in accordance with various examples.

FIG. 1 shows an illustrative block diagram of a power supply system 100 in accordance with various examples. The power supply system 100 includes, in an embodiment, an AC power source 102, a capacitor-drop power supply 104, and a load 106. The AC power source 102 is configured to generate an AC signal 122 at an AC voltage. For example, the AC power source 102 can be mains electricity that is provided through a socket in the wall at a voltage of 120V and a frequency of 60 Hz, 230V and a frequency of 50 Hz, and/or 230V and a frequency of 60 Hz. In other examples, the AC power source 102 can generate and provide AC signal 122 at any AC voltage and frequency.

The capacitor-drop power supply 104 is configured, in an embodiment, to receive the AC signal 122 and generate a regulated output signal 124 to drive load 106. The regulated output signal 124 is a DC signal that has a voltage that is less than the AC voltage in the AC signal 122. For example, the capacitor-drop power supply 104 can receive the AC signal 122 at 120V, convert the AC signal 122 into a DC signal, and generate a DC regulated output signal 124 at 3V or 5V to provide power to load 106. The load 106 can be any electrical circuitry that is powered by regulated output signal 124.

Figure 2:
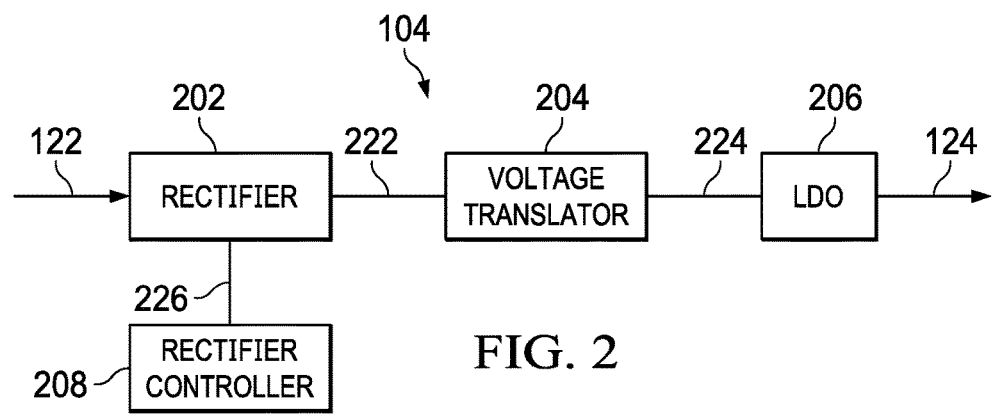
FIG. 2 shows an illustrative block diagram of a capacitor-drop power supply in accordance with various examples.

FIG. 2 shows an illustrative block diagram of capacitor-drop power supply 104 in accordance with various examples. The capacitor-drop power supply 104 includes, in an embodiment, a rectifier 202, a rectifier controller 208, a voltage translator 204, and a low-dropout regulator (LDO) 206. The rectifier 202 is configured to receive the AC signal 122 and convert the AC signal 122 into a rectified DC signal 222 at a rectified voltage. For example, the rectifier 202 can receive the AC signal 122 at 120V and convert the AC signal 122 into rectified DC signal 222 at a rectified voltage of approximately 20V.

The voltage translator 204, which in some embodiments is a switched capacitor DC-DC converter, is configured to receive the rectified DC signal 222 from the rectifier 202 and generate converter output signal 224 at a converter voltage that is proportional to the rectified voltage (the voltage of the rectified DC signal 222). Thus, the voltage translator 204 can act as a voltage drop converter that drops the voltage of the rectified DC signal 222 by N times (e.g., a N:1 switched capacitor converter) to generate the converter output signal 224 at a voltage that is N times less than the voltage of the rectified DC signal 222. In embodiments, at the same time, the voltage translator 204 can act to increase the current of the rectified DC signal 222 by the same N times to generate the converter output signal 224 at a current that is N times greater than the current of the rectified DC signal 222.

For example, the voltage translator 204 can receive the rectified DC signal 222 and generate the converter output signal 224 at a voltage that is four times (N equals four) less than the rectified DC signal 222. Thus, if the rectified DC signal 222 is 20V, then the generated converter output signal 224 voltage can be approximately 5V. In other words, the voltage translator 204 generates a lower voltage DC converter output signal 224 than the rectified DC signal 222 based on the voltage level of the rectified DC signal 222 and the design (e.g., number of flying capacitors and switches) of the voltage translator 204. The voltage translator 204 can be implemented as any type of voltage translator, including any type of switched converter (e.g., a Dickson DC-DC converter, a series-parallel DC-DC converter, a Fibonacci DC-DC converter, an inductor-based buck converter, etc.).

The LDO 206 is configured to receive the converter output signal 224 and regulate the converter output signal 224 to generate the regulated output signal 124 that drives load 106. In other words, the LDO 206 acts to maintain a constant output voltage in the regulated output signal 124. While the LDO 206 is shown in FIG. 2, other types of regulators (e.g., any linear regulator, a switching regulator, etc.) may be utilized. Furthermore, in some embodiments, the converter output signal 224 directly drives the load 106 without an intervening regulator.

The rectifier controller 208 is configured to generate a control signal 226 (e.g., a switch close signal or a switch open signal) that controls at least one low side device within the rectifier 202 based on the rectified DC signal 222. More particularly, the rectifier controller 208 is configured to monitor the rectified DC signal 222 generated by the rectifier 202 (e.g., monitor the rectified voltage) to determine whether the rectified voltage of the rectified DC signal 222 exceeds a threshold value. In response to the rectified voltage exceeding the threshold value, the rectifier controller 208 generates the control signal 226 as a switch close signal that causes at least one, and in some embodiments all, of the low side devices within the rectifier 202 to close (and/or remain closed), thus, shunting the AC signal 122 to ground. In response to the rectified voltage not exceeding the threshold value (e.g., being less than the threshold value), the rectifier controller 208 generates the control signal 226 as a switch open signal that causes at least one, and in some embodiments all, of the low side devices within the rectifier 202 to open (and/or remain open), thus, causing the rectifier 202 to generate the rectifier DC signal 222 as previously discussed.

Figure 3:
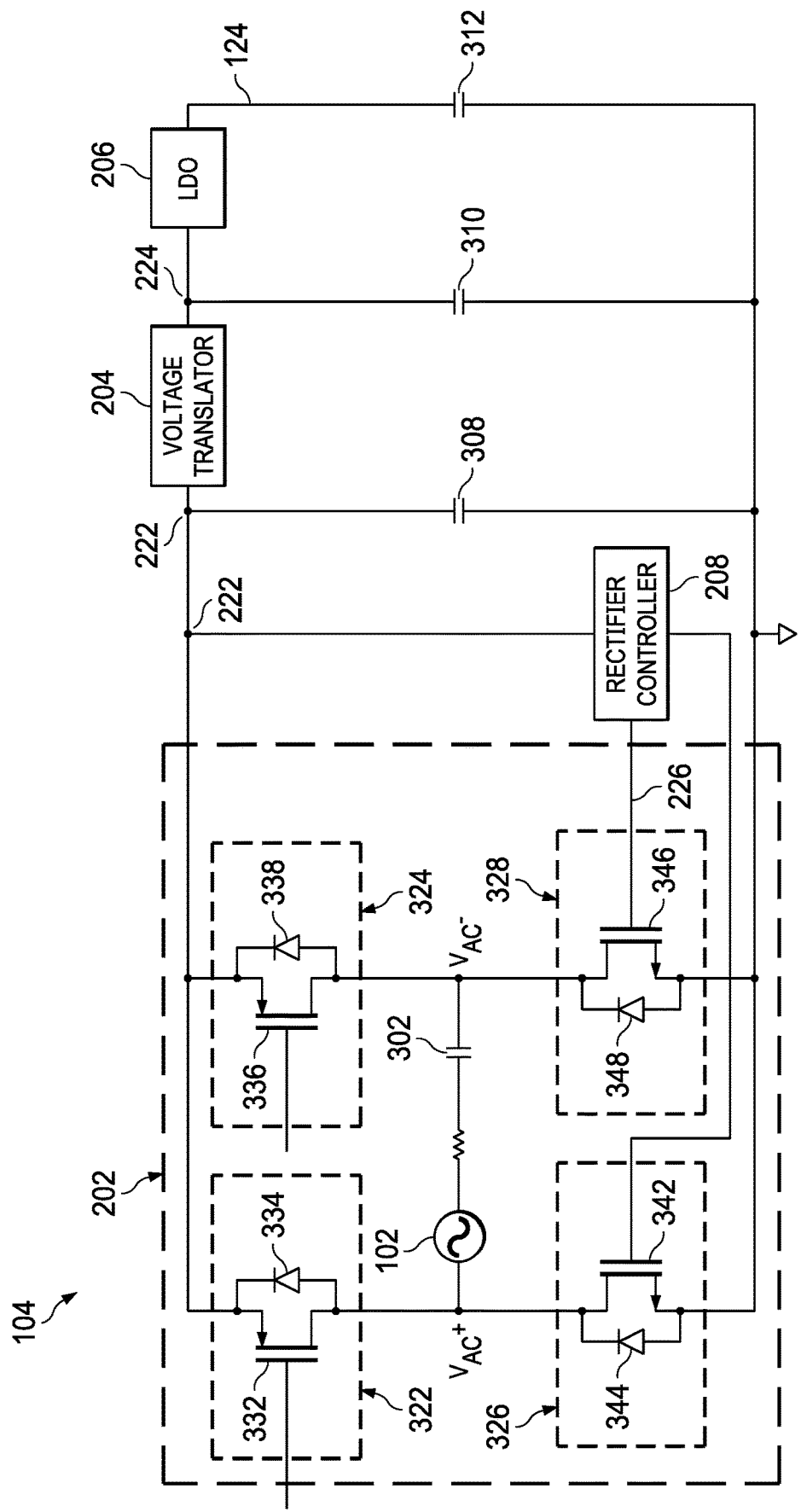
FIG. 3 shows an illustrative circuit diagram of a capacitor-drop power supply in accordance with various examples.

FIG. 3 shows an illustrative circuit diagram of capacitor-drop power supply 104 in accordance with various examples. As discussed above, in an embodiment, the capacitor-drop power supply 104 includes the rectifier 202, the rectifier controller 208, the voltage translator 204, and the LDO 206. The rectifier 202 includes, in some embodiments, a bridge rectifier structure (e.g., a diode bridge) and a capacitor 302. As shown in FIG. 3, the AC power source 102 generates the AC signal 122 with a positive component (VAC+) and a negative component (VAC−). Utilizing the capacitor 302 and the diode bridge, the rectifier generates the rectified DC signal 222.

In some embodiments, the diode bridge comprises two high side devices 322-324 and two low side devices 326-328. The high side device 322 can include switch 332 and diode 334 while high side device 324 can include switch 336 and diode 338. In some embodiments, the switches 332 and 336 are p-channel metal-oxide-semiconductor field effect transistors (PMOS); however, in alternative embodiments the switches 332 and 336 may be any type of field effect transistor (FET) (e.g., n-channel metal-oxide-semiconductor field effect transistors (NMOS)), bipolar junction transistor (BJT), and/or any other type of switch. The low side device 326 can include switch 342 and diode 344 while low side device 328 can include switch 346 and diode 348. In some embodiments, the switches 342 and 346 are NMOS transistors; however, in alternative embodiments the switches 342 and 346 may be any type of FET, BJT, and/or any other type of switch. The rectifier controller 208 is configured to, in an embodiment, generate the control signal 226, as discussed above, based on the rectified DC signal 222. The control signal 226 is received at the gate of switches 342 and 346 thus controlling the switches 342 and 346. Therefore, if the control signal 226 is a switch close signal (e.g., the voltage of the control signal 226 is greater than the threshold voltage of the switches 342 and 346), the switches 342 and 346 will close and/or remain closed once the switch close signal is received at the gate of each switch 342 and 346. As discussed above, once the switches 342 and 346 are closed, the AC signal 122 is shunt to ground. Similarly, if the control signal 226 is a switch open signal (e.g., the voltage of the control signal 226 is less than the threshold voltage of the switches 342 and 346), the switches 342 and 346 will open and/or remain opened once the switch open signal is received at the gate of each switch 342 and 346. Once the switches 342 and 346 are open, the diode bridge operates to generate the rectified DC signal 222 as discussed above.

The capacitor 308 is configured, in some embodiments, to ensure that a constant rectified DC signal 222 is provided to the voltage translator 204. As discussed above, the voltage translator 204 receives the rectified DC signal 222 and generates the converter output signal 224. The capacitor 310 is configured, in some embodiments, to ensure that a constant converter output signal 224 is provided to the LDO 206. As discussed above, the LDO 206 receives the converter output signal 224 and generates the regulated output signal 124. The capacitor 312, in some embodiments, is configured to ensure that a constant regulated output signal 124 is provided to the load 106.

Figure 4:
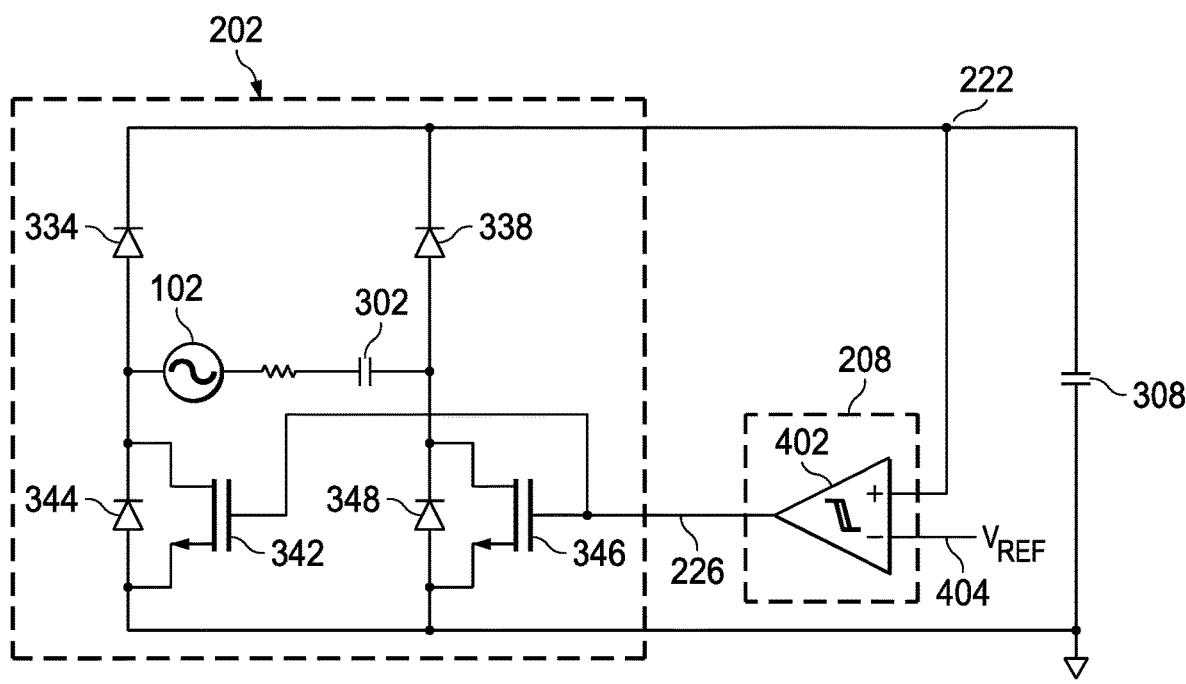
FIG. 4 shows an illustrative circuit diagram of a rectifier being controlled by a rectifier controller in a capacitor-drop power supply in accordance with various examples.

FIG. 4 shows an illustrative circuit diagram of rectifier 202 being controlled by rectifier controller 208 in capacitor-drop power supply 104 in accordance with various examples. In some embodiments, the rectifier controller 208 includes a comparator 402. The comparator 402 is configured to receive the rectified DC signal 222 and a reference voltage signal 404 at a reference voltage. The comparator acts to compare the rectified voltage of the rectified DC signal 222 with the reference voltage of the reference voltage signal 404. In response to the rectified voltage exceeding the reference voltage, the comparator 402 generates the control signal 226 as a switch close signal causing the switches 342 and 346 to close and/or remain closed, thus, shunting the AC signal 122 to ground. However, in response to the rectified voltage not exceeding (e.g., is less than) the reference voltage, the comparator 402 generates the control signal 226 as a switch open signal causing the switches 342 and 346 to open and/or remain open.

In an embodiment, the reference voltage of reference voltage signal 404 is based on the voltage requirements of the load 106. For example, if the load 106 requires a 5V power supply (e.g., the capacitor-drop power supply 104 is configured to generate a regulated output signal 124 at 5V), then the rectifier rectified voltage of rectified DC signal 222 should be approximately 20V if the voltage translator 204 is configured to generate a converter output signal 224 that is four times less than the rectified voltage (e.g., N=4 in an N:1 linear DC-DC converter). Thus, if the rectified voltage of the rectified DC signal 222 is greater than 20V, then the LDO 206 will consume excess power to generate the regulated output signal 124 at 5V. Therefore, in this example, the reference voltage can be set to 20V, so that if the rectified voltage exceeds the 20V, the AC signal 122 is shunted to ground until the rectified voltage drops down to 20V again.

Figure 5:
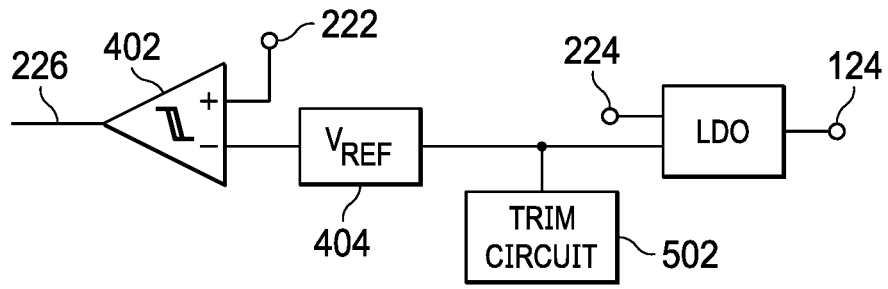
FIG. 5 shows an illustrative circuit diagram of a trim circuit for updating a reference voltage for a rectifier controller of a capacitor-drop power supply in accordance with various examples.

FIG. 5 shows an illustrative circuit diagram of a trim circuit 502 for updating the reference voltage of the reference voltage signal 404 for the comparator 402 of rectifier controller 208 of capacitor-drop power supply 104 in accordance with various examples. As discussed above, the reference voltage of reference voltage signal 404 is set based on the voltage requirements of the load 106. Therefore, as discussed in the previous example, if the load requires 5V, then the reference voltage can be set to 20V assuming the voltage translator 204 is an N=4, N:1 linear DC-DC converter. If the load 106 voltage requirements change, then the trim circuit 502 is configured to scale (e.g., change) the reference voltage in the reference signal 404 accordingly. For example, assuming the load 106 changes from requiring 5V to requiring 3V. Then, the rectified voltage of the rectified DC signal 222 should be approximately 12V if the voltage translator 204 is configured to generate a converter output signal 224 that is four times less than the rectified voltage (e.g., N=4 in an N:1 linear DC-DC converter) and the reference voltage can be set to 12V. Therefore, the trim circuit 502 is configured to change the reference voltage of the reference voltage signal 404 from 20V to 12V. In this way, the reference voltage of the capacitor-drop power supply 104 is scalable based on the voltage requirements of the load 106, and thus, efficiency is improved (e.g., excessive power consumption in the LDO 206 minimized) even as the voltage requirements for the load 106 change).

Figure 6:
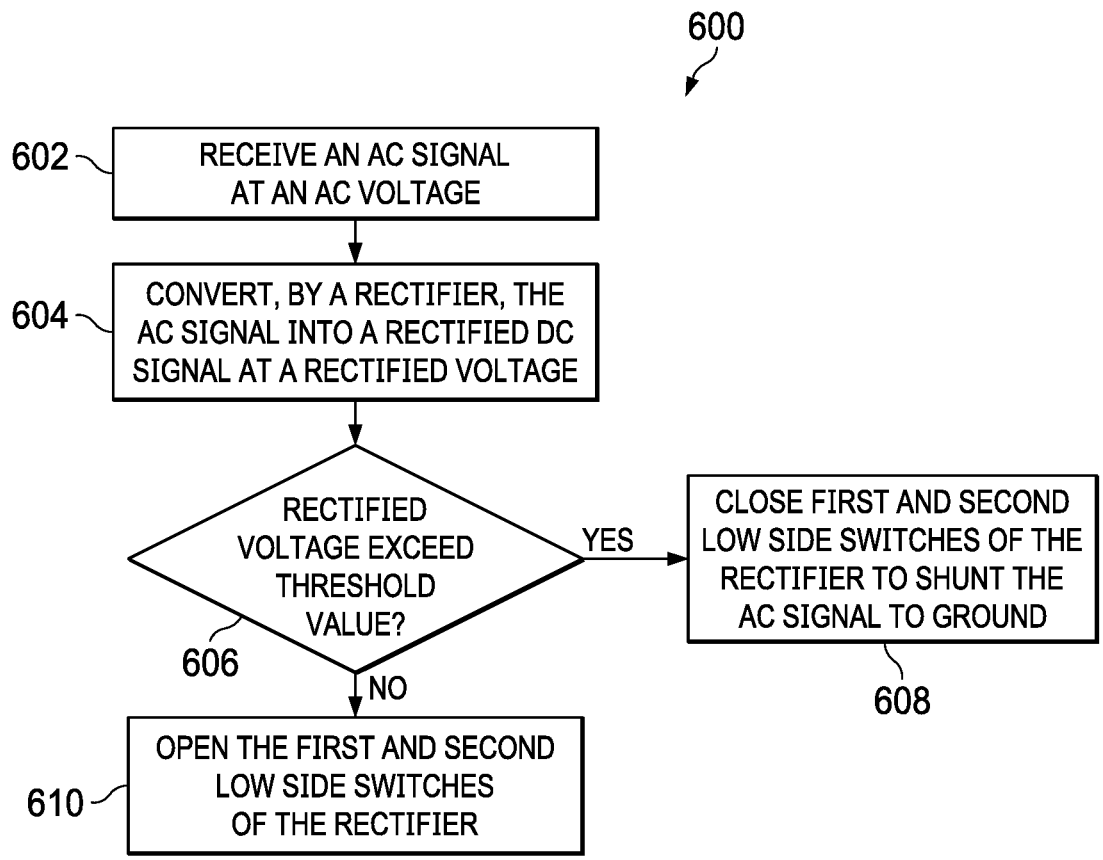
FIG. 6 shows an illustrative flow diagram of clamping an AC signal in a capacitor-drop power supply in accordance with various examples.

FIG. 6 shows an illustrative flow diagram of a method 600 of generating a DC signal in a capacitor-drop power supply in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, are performed by the capacitor-drop power supply 104 and more particularly by the rectifier 202, the rectifier controller 208, the voltage translator 204 (e.g., capacitor switched converter), and/or the LDO 206 and implemented in logic.

The method 600 begins in block 602 with receiving an AC signal at an AC voltage. For example, the rectifier 202 can receive the AC signal 122 at an AC voltage (e.g., 120V) from the AC power source 102. In block 604, the method 600 continues with converting the AC signal into a rectified DC signal at a rectified voltage. For example, the rectifier 202 can convert the AC signal 122 into the rectified DC signal 222 at a rectified voltage (e.g., 20V) and a rectified current. The method 600 continues in block 606 with determining whether the rectified voltage of the rectified DC signal exceeds a threshold value. For example, comparator 402 of the rectifier controller 208 can compare the rectified voltage of rectified DC signal 222 with a reference voltage of the reference voltage signal 404 (e.g., the threshold value).

If in block 606, a determination is made that the rectified voltage of the rectified DC signal exceeds the threshold value, the method 600 continues in block 608 with closing first and second low side switches of the rectifier to shunt the AC signal to ground. For example, if the rectified voltage of rectified DC signal 222 is greater than the reference voltage of reference voltage signal 404, then the rectifier controller 208 generates control signal 226 as a switch close signal that is received by the gates of low side switches 342 and 346, causing the switches 342 and 346 to close. Once switches 342 and 346 close, the AC signal 122 is shunted to ground.

However, if in block 606, a determination is made that the rectified voltage of the rectified DC signal does not exceed the threshold value (e.g., is less than the threshold value), the method 600 continues in block 610 with opening the first and second low side switches of the rectifier. For example, if the rectified voltage of rectified DC signal 222 is less than the reference voltage of reference voltage signal 404, then the rectifier controller 208 generates control signal 226 as a switch open signal that is received by the gates of low side switches 342 and 346, causing the switches 342 and 346 to open. Once switches 342 and 346 open, the rectified DC signal 222 is generated at the rectified voltage by the rectifier 202.

Modifications are possible in the described embodiments, and other embodiments are possible, within the scope of the claims.

What is claimed is:

1. A power supply, comprising:
a ground terminal;
a rectifier having a rectifier input and a rectifier output, the rectifier configured to provide a rectified voltage at the rectifier output responsive to an alternating current (AC) signal at the rectifier input, the rectifier including a switch coupled between the rectifier input and the ground terminal, the switch having a gate, and the switch configured to selectively couple the rectifier input to the ground terminal responsive to a control signal at the gate;
a voltage translator having a voltage input and a voltage output, the voltage input coupled to the rectifier output, the voltage translator configured to provide a converter voltage at the voltage output, in which the converter voltage is proportional to the rectified voltage;
a trim circuit having a trim circuit output, the trim circuit is configured to provide a trimmable reference voltage on the trim circuit output;
a low-dropout (LDO) regulator having a regulator input, a reference voltage input, and a regulator output, the regulator input coupled to the voltage output, the LDO regulator configured to provide a regulated output voltage at the regulator output responsive to the converter voltage, and the reference voltage input coupled to the trim circuit output; and
a comparator having a comparator output and first and second comparator inputs, the first comparator input coupled to the rectifier output, the second comparator input coupled to the trim circuit output, the comparator output coupled to the gate, and the comparator configured to provide the control signal at the comparator output responsive to a comparison by the comparator between the rectified voltage and the reference voltage.

2. The power supply of claim 1, wherein:
the switch is a first switch, and the gate is a first gate; and
the rectifier includes a second switch having a second gate coupled to the comparator output.

3. The power supply of claim 2, wherein the first switch and the second switch are field effect transistors (FETs).

4. The power supply of claim 1, wherein the power supply is a capacitor-drop power supply.

5. The power supply of claim 1, wherein the comparator is configured to provide the control signal responsive to the rectified voltage exceeding the trimmable reference voltage.

6. The power supply of claim 5, wherein:
the control signal is a first control signal, and the switch is configured to selectively decouple the rectifier input from the ground terminal responsive to a second control signal at the gate; and
the comparator is configured to provide the second control signal at the comparator output responsive to the rectified voltage not exceeding the trimmable reference voltage.

7. The power supply of claim 1, wherein the rectifier is a bridge rectifier.

8. The power supply of claim 7, wherein the switch is a first low side switch coupled across a first diode, and the rectifier includes a second low side switch coupled across a second diode, a first high side switch coupled across a third diode, and a second high side switch coupled across a fourth diode.

9. A circuit, comprising:
a ground terminal;
a low-dropout (LDO) regulator configured to receive a trimmable reference voltage;
a controller having a controller input and a controller output; and
a voltage rectifier having a rectifier output coupled to the controller input, the voltage rectifier including:
a first low side device having a first gate coupled to the controller output;
a second low side device having a second gate coupled to the controller output;
a first high side device coupled between the rectifier output and the first low side device, in which the first low side device is coupled between the first high side device and the ground terminal; and
a second high side device coupled between the rectifier output and the second low side device, in which the second low side device is coupled between the second high side device and the ground terminal;
in which the controller is configured to provide a control signal at the controller output responsive to a voltage at the rectifier output exceeding the trimmable reference voltage, the first low side device is configured to selectively couple the first high side device to the ground terminal responsive to the control signal, and the second low side device is configured to selectively couple the second high side device to the ground terminal responsive to the control signal.

10. The circuit of claim 9, wherein:
the first low side device includes a first switch coupled across a first diode;
the second low side device includes a second switch coupled across a second diode;
the first high side device includes a third switch coupled across a third diode; and
the second high side device includes a fourth switch coupled across a fourth diode.

11. The circuit of claim 10, wherein:
the first switch includes a first source coupled to the ground terminal, and a first drain coupled to the first high side device; and
the second switch includes a second source coupled to the ground terminal, and a second drain coupled to the second high side device.

12. The circuit of claim 11, wherein the voltage at the rectifier output is a rectified voltage, and the rectifier is configured to provide the rectified voltage responsive to an alternating current (AC) signal.

13. The circuit of claim 9, wherein:
the control signal is a first control signal, and the controller is configured to provide a second control signal at the controller output responsive to the voltage at the rectifier output not exceeding the trimmable reference voltage; and
the first low side device is configured to selectively decouple the first high side device from the ground terminal responsive to the second control signal, and the second low side device is configured to selectively decouple the second high side device from the ground terminal responsive to the second control signal.

* * * * *